June 6, 1950     M. J. KERMER     2,510,233
APPARATUS FOR EVAPORATING VISCOUS LIQUIDS
Filed March 6, 1944
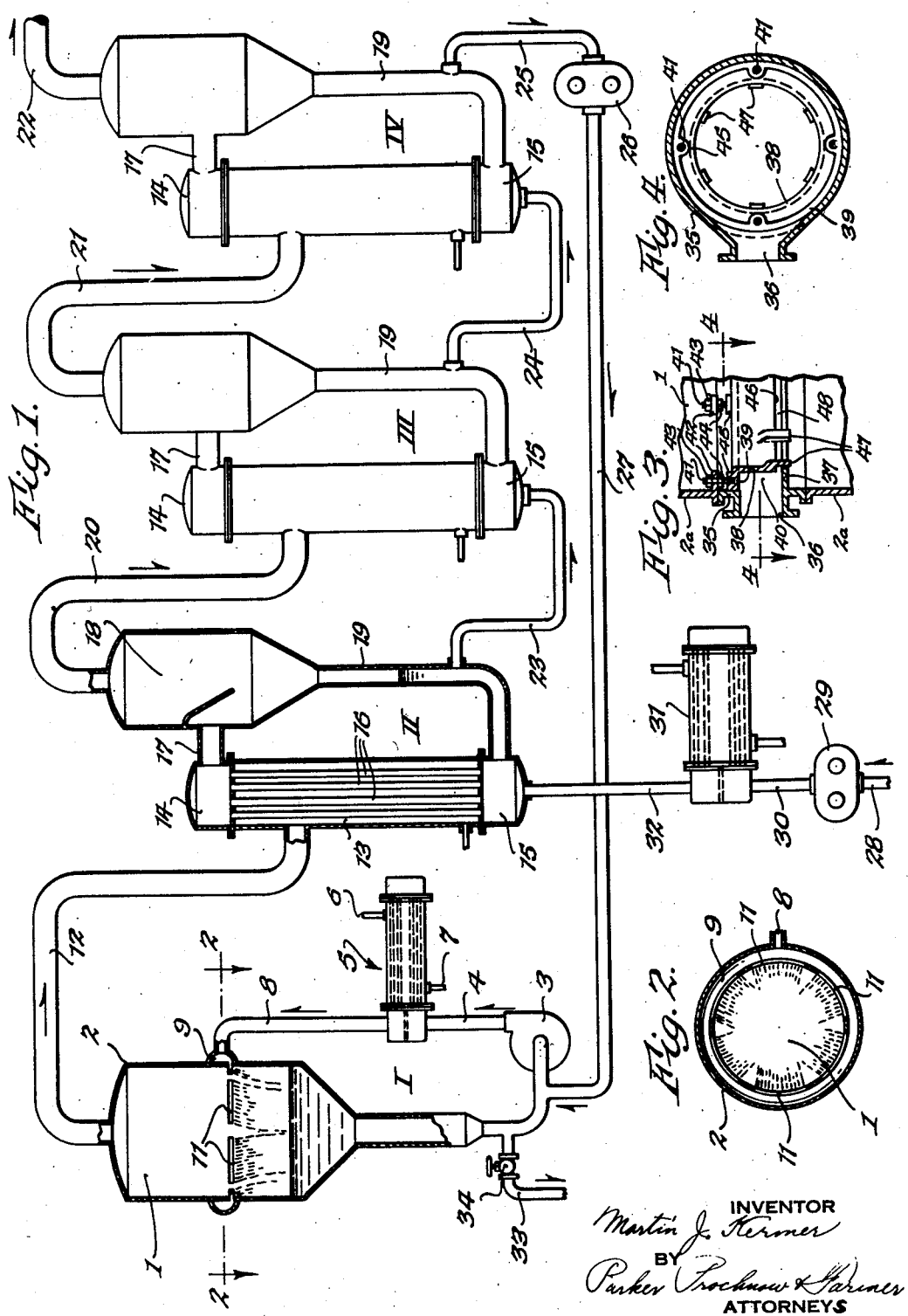
INVENTOR
Martin J. Kermer
BY
Parker Prochnow & Gardner
ATTORNEYS Patented June 6, 1950

2,510,233

UNITED STATES PATENT OFFICE 2,510,233

APPARATUS FOR EVAPORATING VISCOUS LIQUIDS

Martin J. Kermer, Buffalo, N. Y., assignor, by mesne assignments, to Blaw-Knox Company, Pittsburgh, Pa., a corporation of New Jersey Application March 6, 1944, Serial No. 525,192

3 Claims. (Cl. 159—3)

1

This invention relates to the concentration of liquids containing in suspension therein a considerable proportion of solids such as distillery slop and the like, in multiple effect evaporators. In concentrating liquids of this type, the presence of the solids in suspension causes these liquids to thicken to such an extent that even at moderate concentration they no longer flow freely and appear to become viscous as indicated by a viscometer. When circulated through conventional tubular heaters or heated in conventional tubular evaporators, the rate of heat transfer at this stage is greatly reduced because the heat absorbed by the layer of liquid in contact with the heating tubes cannot be distributed rapidly through the mass of the liquid in these tubes by convection currents such as occur in clear liquids of low viscosity. Vapor bubbles formed by boiling of these liquids in evaporator tubes also are much less effective in establishing turbulence in the liquid in the tubes and in carrying the liquid through the tubes at high velocity, so essential to obtaining a favorable rate of heat transfer.

When, after heating in a suitable heater, the liquid at this stage is passed into a flash chamber in order to increase its concentration by evaporation the maximum possible degree of evaporation is not obtained because the liquid does not break up readily into sufficiently small particles or thin layers and as a result part of the heat absorbed in the heater is not released or part of the vapor formed is not released before the liquid reaches the bottom of the flash chamber.

An object of the invention is to provide an improved, simple and effective method of concentrating such liquids in multiple effect evaporators, with which the capacity of the apparatus heretofore used can be substantially increased without any change in the structure of the evaporators or apparatus used, which will decrease the cost of operation of the evaporators, and with which maximum capacity of the evaporators may be obtained with the most effective temperature in the first and in the last effect.

Another object of the invention is to provide an improved construction of evaporator that will have maximum effectiveness and efficiency when handling viscous and heavy liquids as in effect I of a multiple effect evaporator, and which will be relatively simple and inexpensive.

Other objects and advantages will be apparent from the following description of one embodiment of the invention, and the novel features will be particularly pointed out hereinafter in connection with the appended claims.

2

In the accompanying drawing:

Fig. 1 is a schematic diagram illustrating apparatus that may be employed in the practice of the invention;

Fig. 2 is a sectional plan through the first effect evaporator of Fig. 1, to illustrate the manner in which the relatively viscous concentrated liquid is spread out in thin streams in order to facilitate evaporation by flashing as it is discharged into the evaporator chamber.

Fig. 3 is a sectional elevation of a portion of an evaporator constructed in accordance with this invention and suitable for effect I, but representing a modification of the construction shown in Figs. 1 and 2 by which the thickness of the streams can be varied; and Fig. 4 is a sectional plan of the same, the section being taken approximately along the line 4—4 of Fig. 3.

Heretofore, a multiple three- or four-effect evaporator has been employed, for example, in concentrating a liquid carrying solids in suspension, such as distillery slop, to an extent such that it may be dried by means of drying drums or other apparatus common in the industry. In concentrating these liquids in a multiple effect evaporator, consisting of 3 or 4 effects arranged in series and operating at successively lower pressures, it has become customary to feed the liquid in its original condition to the second of these effects, pass it through the subsequent to the last effect and then transfer it to the first effect, operating at the highest pressure and the highest temperature. This is done to handle the liquid at its highest concentration at the highest available temperature in order to increase its fluidity as much as possible and thereby increase the rate of heat transfer.

In general it is considered desirable to maintain the largest possible difference in temperature between the steam in the first effect and the liquid in the last effect because total heat transfer generally increases as this difference increases. Temperatures of the liquid in the other effects are determined by the relative heating surfaces and individual heat transfer rates or coefficients in each of the effects, a balance being automatically established to satisfy the law of conservation of energy.

With liquids containing solids in suspension, however, I have discovered that the overall temperature difference may be decreased while at the same time the total heat transfer is increased and that there is a definite temperature range in the first and last effects in which the liquid is handled in its more concentrated stages, in which the individual heat transfer rates increase in a greater proportion than the decrease in temperature difference necessary to establish these temperatures. As a result the overall heat transfer is increased. By the use of this invention, the output of such an apparatus was increased approximately 20% without any change in the structure of the apparatus by establishing the most effective temperatures in the first and last effect.

A further increase can be obtained by a minor change in the structure used in the first effect. Referring particularly to the drawing and the schematic illustration of one form of apparatus in Figs. 1 and 2, by which the method may be practiced, there are in this example, four effects arranged side by side in sequence, and identified by the Roman numerals I, II, III, and IV. In the first effect, which preferably is of the external heater type, there is a chamber 1 provided in a housing 2. A pump 3 is connected at its intake side to the bottom of the chamber 1, so as to withdraw liquid from the chamber, and at its outlet or output side the pump 3 is connected by a pipe 4 to a suitable heater 5, where the liquid is heated by steam supplied through a pipe 6, with condensation removed through pipe 7. In this heater 5 the liquid is passed through steam jacketed tubes and delivered from the heater 5 by a pipe 8 to an annular conduit 9 which extends around the outside of the housing 2 at a point well above the maximum expected liquid level 10 in the chamber 1.

The housing 2 is provided with a plurality of relatively long, narrow slits 11 arranged end to end and in spaced relation to each other around the inner periphery of the housing 2, and connecting the passage of the conduit 9 with the interior of the chamber 1. The liquid from the pipe 8 and conduit 9 will, therefore, be discharged into the chamber 1 in a plurality of thin, broad, approximately horizontal streams with gaps between adjacent side edges of the streams so that by this broad surface exposure of the streams to the atmosphere of the chamber 1, evaporation may easily take place from both faces of the streams, and the vapor released from the lower faces of the streams may easily pass upwardly through the gaps between the streams. The upper part of the chamber 1 is connected by a pipe 12 with the jacket or heating chamber 13 of an evaporator forming the second effect (II).

Any suitable evaporator units may be used for these effects, but preferably those for effects II, III and IV are of the type known as "long tube evaporators," and may be identical in construction. These long tube evaporators have upper and lower headers or chambers 14 and 15 respectively, connected by a plurality of tubes 16. The upper header 14 is connected by a pipe 17 with a separating chamber 18, the lower part of which chamber 18 is connected by a pipe 19 with the lower header 15. The vapors in the chamber 1 pass through the pipe 12 to the chamber 13 of effect II where they heat the liquid in the tubes 16 of the second effect, and the vapors released from the liquid in the tube 16 will pass into the chamber 18 where the entrained liquid is separated. This entrained liquid passes downwardly through the pipe 19 to the lower chamber 15, and the vapors from chamber 18 are connected by pipe 20 to a corresponding chamber 13 in the evaporator of effect III.

The vapors from the evaporator of the third effect are conducted by a pipe 21 to the heating chamber of the evaporator forming the fourth effect and the vapors from the fourth effect are discharged by a pipe 22 which leads to a suitable condenser or other means for creating a partial vacuum in the chamber 18 of the fourth effect. The pipe 19 of the second effect is also connected by branch pipe 23 to the lower header or chamber 15 of the third effect and the pipe 19 of the third effect is connected by a pipe 24 to the lower header 15 of the evaporator of the fourth effect. The pipe 19 of the fourth effect is connected by a pipe 25 to the intake side of a suitable pump 26, and the output side of that pump is connected by a pipe 27 to the intake side of the pump 3.

The distillery slop or other liquid to be concentrated is removed from a suitable storage tank (not shown) through a pipe 28 connected to the intake side of a pump 29, and the output side of the pump 29 is connected by a pipe 30 to one side of a suitable heater 31. The output side of the heater 31 is connected through a pipe 32 to the lower header or chamber 15 of the second effect. The heater 31 may be of any suitable type, that shown being a tube heater where the liquid to be heated is moved progressively through tubes that are steam jacketed. The distillery slop carrying approximately 4% solids is delivered by pipe 28, pump 29 and pipe 30 continuously to the heater 31 where this liquid is raised to a temperature of approximately 200° F. before delivery to the second effect. In the evaporator of this second effect, the percentage of solids is increased, for example, to approximately 5%, and this concentrated liquid is delivered progressively and continuously through the pipe 23 to the third effect evaporator where the temperature heretofore has been approximately 177° F. and where the concentration of solids is increased to approximately 7%. The liquid then passes through the pipe 24 to the evaporator of the fourth effect, where the solids percentage is increased to approximately 11.5% at a temperature heretofore of approximately 138° F.

From the evaporator of the fourth effect, the liquid passes through pipe 25, pump 26, pipe 27, pump 3, heater 5, pipe 8 and conduit 9 into the chamber 1 where this liquid is flashed, the vapors passing off being conducted through the pipe 12 to supply the heat for the evaporator of the second effect. The condensed liquids from the chamber 1 are withdrawn from the bottom by pump 3 and delivered through heater 5 back to chamber 1, but a portion is removed continuously by a pipe 33 controlled by a suitable valve 34, beginning after the desired degree of concentration in effect I has been reached. Heretofore the steam supplied to the first effect, such as to the heater 5 thereof, was at approximately 20 pounds gage pressure at a temperature of approximately 258° F. This gave a temperature of liquid in the first effect of approximately 198° F. to 200° F., with a vacuum of approximately 7 inches in the chamber 1. The temperature in the fourth effect was approximately 130° F. to 138° F. with a vacuum of approximately 23.5 or 24.5 inches. This gave a gross temperature difference that of the steam supplied to the first effect and the temperature of the liquid leaving the fourth effect of approximately 120° F. to 128° F.

I have discovered that by decreasing the amount of vacuum in the evaporator of the fourth effect, the temperature of the liquid in that effect can be increased to approximately 145° F. or above, and preferably to around 150° F. to 155° F. A temperature of approximately 150° F. is obtained, for example, by using only 22 inches of vacuum in the chamber of the fourth effect. With this decrease in vacuum in the fourth effect, the vacuum in the first effect is also decreased to approximately 4 inches, and the temperature of the liquid in the chamber 1 of the first effect, therefore, rises to at least 205° F., and is preferably further increased by other means to around 210° F. to 212° F.

The steam necessary for the first effect in accordance with this invention can be at approximately 17 pounds gage pressure with a temperature of about 253° F. Under such a condition, and with the temperature in the chamber of the fourth effect at about 150° F., one would have a gross temperature differential of approximately 103° F. between the first and fourth effects. With this decrease of 17° F. in the gross temperature differential between the steam in the first and the liquid in the fourth effect, an increase of approximately 20% of the output of apparatus was obtained with steam at a lower gage pressure. The percentage of solids in the concentrated liquid leaving the first effect was approximately 32.2% both before and after the adjustment of the temperatures and vacuum.

I also discovered that not only do I obtain an increase of approximately 20% in the capacity of the apparatus by this change in the temperatures in the first and fourth effects, but I also found that the tubes in the different effects, particularly the first and fourth effects were kept much cleaner. The liquid discharged into the chamber 1 of the first effect, because of the relatively great concentration of solids therein, is rather heavy and slow flowing and heretofore it has been discharged as a rather stiff stream with only a relatively limited surface area thereof available for evaporation of moisture therefrom by flashing, and I have found that by discharging this liquid from the pipe 8 into the chamber 1 as broad thin streams, the surface areas of the discharged streams which are exposed in the chamber 1 are so greatly increased that evaporation and release of vapor in chamber 1 is noticeably increased, and the temperature difference between the liquid in the lower part of the chamber 1 and the vapor in the upper part of the chamber 1 is greatly decreased.

It will be observed from the foregoing that by adjusting the vacuum in the chamber of the fourth effect, the temperatures in the first and last effects may be increased, and by further increasing the temperature in the first effect a very pronounced increase in the capacity of the apparatus has been obtained.

In the embodiment of the invention shown in Figs. 3 and 4, the housing of the first effect is constructed somewhat differently than in Figs. 1 and 2 in order to provide for a less expensive construction and to enable adjustment to be made of the thickness of the streams discharged into the chamber 1. For this purpose, the housing 2a has included therein an intermediate section 35 which forms with the upper and lower sections a complete housing. This section 35 may have flanges along its upper and lower edges which are clamped to corresponding flanges on the abutting edges of the adjacent sections of the housing. This section 35 has an opening 36 to which the pipe 8 is connected, and also has an internally extending, annular flange 37 advantageously located at approximately the same level as the lower edge of the opening 36 but which need not necessarily be at that level. Disposed above the flange 37 within chamber 1 is an annular ring 38 whose internal diameter is approximately that of the diameter of the inner periphery of the flange 37. The upper edge of the ring 38 is provided with an outwardly extending annular flange 39 which abuts against and slides freely along the inner wall of the section 35 in a vertical direction, and cooperates with the section 35 to form between section 35, ring 38 and flange 39 an annular passage 40 which corresponds to the conduit 9 in Figs. 1 and 2.

Screws 41 are rotatably and slidably mounted in lugs 42 that extend inwardly, from the upper section of the housing 2a and are spaced apart around the periphery of section 35. Nuts 43 and 44 are provided on the screws 41 above and below the lugs 42 and serve to confine the screws 41 to the lugs 42, but yet allow the screws 41 to be adjusted vertically in either direction without rotation of the screws, and when so adjusted vertically the screws 41 will be held in such adjusted position. The lower end of each screw is threaded into a lug 45 on the flange 39, so that by elevating and lowering the screws 41 vertically through suitable manipulation of the nuts 43 and 44, the ring 38 may be shifted vertically to a limited extent. The lower edge 46 of the ring 38 is normally disposed above the upper edge or face of the flange 37, so as to form with the flange 37 a peripherally extending aperture connecting the annular chamber 40 with the interior of the chamber 1. Lugs 47 may be provided on the ring 38 to extend in overrunning but abutting relation past the flange 37, and spaced apart around the periphery of chamber 1 so as to guide the ring 38 vertically during its movement. The lugs 47 also provide gaps between the stream sections through which vapors released from the lower faces of the stream sections may pass upwardly to the top of chamber 1. This construction is relatively inexpensive to build and enables adjustment of the ring 38 vertically, so that the gap 48 between the lower edge 46 of the ring 38 and the flange 37 may be varied, which varies the thickness of the relatively broad thin streams that are discharged into the chamber 1.

It will be understood that various changes in the details, temperatures and conditions which have been herein disclosed in order to explain the nature of the invention, and in the details by which the streams discharge into the chamber 1 of the first effect may be broadened, may be made by those skilled in the art within the principle and scope of the invention as expressed in the appended claims.

I claim:

1. In apparatus for condensing liquids by evaporation of volatile components, an improved evaporator for relatively slow flowing viscous liquids, which comprises a casing having a chamber, said casing having a conduit extending along a wall of said chamber and having a relatively narrow, long, generally horizontal slit opening into said chamber above maximum expected liquid level in said chamber so as to discharge a liquid from said conduit into said chamber as a relatively thin, broad sheet, and means for withdrawing liquid from said chamber below the liquid level therein, and delivering it under pressure to said conduit for discharge back into said chamber.

2. In apparatus for condensing liquids by evaporation of volatile components, an improved evaporator for relatively slow flowing viscous liquids, which comprises a casing having a chamber, said casing having a conduit extending along a wall of said chamber and having a relatively narrow, long, generally horizontal slit opening into said chamber above maximum expected liquid level in said chamber so as to discharge a liquid from said conduit into said chamber as a relatively thin, broad sheet, and means for withdrawing liquid from said chamber below the liquid level therein, and delivering it under pressure to said conduit for discharge back into said chamber, said slit being formed of a plurality of separate sections arranged in spaced relation end to end along the approximately horizontal periphery of said chamber so as to deliver said sheet in relatively broad, thin sections separated by gaps, whereby vapors released from the lower faces of said liquid sheet sections may pass upwardly through said gaps.

3. In apparatus for condensing liquids by evaporation of volatile components, an improved evaporator for relatively slow flowing viscous liquids, which comprises a casing having a chamber, said casing having a conduit extending along a wall of said chamber and having a relatively narrow, long, generally horizontal slit opening into said chamber above maximum expected liquid level in said chamber so as to discharge a liquid from said conduit into said chamber as a relatively thin, broad sheet, and means for withdrawing liquid from said chamber below the liquid level therein, and delivering it under pressure to said conduit for discharge back into said chamber, said chamber having therein a ledge, a ring within and spaced from said chamber at one side of said ledge but flanged into sliding contact with the wall of said chamber at a substantial distance from the edge of the ring nearest said ledge, the ring with its flange, the ledge and the wall of the chamber forming said conduit, and the space between an end edge of said ring and said ledge forming said opening, said ring and ledge having relatively overrunning lug portions to break up the stream into sections separated by gaps.

MARTIN J. KERMER.

REFERENCES CITED

The following references are of record in the file of this patent:

UNITED STATES PATENTS

| Number | Name | Date |
|---|---|---|
| 958,902 | Brinkmann | May 24, 1910 |
| 997,502 | Kestner | July 11, 1911 |
| 1,735,980 | Sadtler | Nov. 19, 1929 |
| 1,930,861 | Reich | Oct. 17, 1933 |
| 2,044,095 | Moore | June 16, 1936 |

FOREIGN PATENTS

| Number | Country | Date |
|---|---|---|
| 520,064 | Great Britain | Apr. 12, 1940 |

OTHER REFERENCES

Badger—Heat Transformation and Evaporation—pages 157, 186–190.

Millard—Physical Chemistry for Colleges—pages 125-6.